United States Patent
Yamakawa et al.

(10) Patent No.: US 8,715,801 B2
(45) Date of Patent: May 6, 2014

(54) HOSE FOR TRANSPORTING REFRIGERANT

(75) Inventors: Kazuto Yamakawa, Hiratsuka (JP);
Yasuaki Shinoda, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 13/825,805

(22) PCT Filed: Aug. 8, 2011

(86) PCT No.: PCT/JP2011/068058
§ 371 (c)(1),
(2), (4) Date: Mar. 22, 2013

(87) PCT Pub. No.: WO2012/039203
PCT Pub. Date: Mar. 29, 2012

(65) Prior Publication Data
US 2013/0174933 A1  Jul. 11, 2013

(30) Foreign Application Priority Data
Sep. 24, 2010  (JP) .................. 2010-214530

(51) Int. Cl.
*B32B 1/08* (2006.01)
*B32B 23/00* (2006.01)
(52) U.S. Cl.
USPC ..... 428/36.91; 428/34.1; 428/34.2; 428/35.7; 428/35.9; 428/36.9
(58) Field of Classification Search
USPC .......... 428/34.1, 34.2, 35.7, 35.9, 36.9, 36.91
See application file for complete search history.

(56) References Cited

U.S. PATENT DOCUMENTS

| | | |
|---|---|---|
| 5,362,530 A | 11/1994 | Kitami et al. |
| 5,488,974 A | 2/1996 | Shiota et al. |
| 6,397,912 B1 | 6/2002 | Watanabe et al. |
| 6,534,578 B1 * | 3/2003 | Daikai et al. .................. 524/323 |
| 7,067,592 B2 * | 6/2006 | Chino et al. ................ 525/327.6 |
| 2011/0186170 A1 | 8/2011 | Oishi et al. |

FOREIGN PATENT DOCUMENTS

| | | | |
|---|---|---|---|
| JP | 58013643 | * | 1/1983 |
| JP | 7117178 | | 5/1995 |
| JP | 10114840 | | 5/1998 |
| JP | 2938538 | | 8/1999 |
| JP | 2000220770 | | 8/2000 |
| JP | 2006077090 | | 3/2006 |
| JP | 4365454 | | 11/2009 |

* cited by examiner

*Primary Examiner* — Marc Patterson
(74) *Attorney, Agent, or Firm* — Thorpe North & Western LLP

(57) ABSTRACT

A hose for transporting refrigerant includes an inner tube layer having a gas barrier layer and a rubber layer adjacent to the outer surface of the gas barrier layer. The gas barrier layer is formed using a thermoplastic resin composition comprising a polyamide resin and a modified rubber having an acid anhydride group or an epoxy group, the modified rubber being obtained by modifying a modified raw rubber having an acid anhydride group or an epoxy group with a hydrogen bond-forming compound having a functional group which reacts with the acid anhydride group or the epoxy group and a functional group which is able to form a hydrogen bond with an amide bond or a hydroxyl group. The rubber layer is formed using a rubber composition comprising from 1 to 15 parts by mass of an alkylphenol-formaldehyde resin per 100 parts by mass of a raw rubber.

11 Claims, 1 Drawing Sheet

HOSE FOR TRANSPORTING REFRIGERANT

TECHNICAL FIELD

The present technology relates to a hose for transporting refrigerant.

BACKGROUND

In recent years, laminates of a resin obtained by combining a resin material such as a polyamide or the like having low gas permeability and a rubber material have been conventionally used as hoses for transporting refrigerant used in car air conditioning systems and the like. The present applicants have previously proposed a hose in which a resin and a rubber are joined without using an adhesive or the like (Japanese Patent No. 4365454) as well as a thermoplastic elastomer resin composition with low gas permeability consisting of a rubber/matrix resin/gas barrier resin capable of dramatically improving gas permeation resistance in addition to flexibility by controlling the dispersion structure (morphology) of a thermoplastic resin composition layer with low gas permeability (gas barrier resin), thereby enabling a reduction in the thickness of an air (gas) permeability prevention layer of a pneumatic tire or hose and contributing to a reduction in tire weight, and a manufacturing method the composition (Japanese Unexamined Patent Application Publication No. H10-114840A). Japanese Unexamined Patent Application Publication No. 2000-220770A has been proposed previously as a hose for bonding the innermost layer and the intermediate rubber layer without using an adhesive.

As a result of investigations conducted by the present inventors, it became clear that it is difficult to directly bond a resin layer and a rubber layer by vulcanization bonding without pretreatment prior to adhesion (for example, application of an adhesive to the resin layer and/or rubber layer, surface treatment of the resin layer, or the like) between the resin layer and the rubber layer and that there is room for improvement regarding the adhesiveness thereof.

SUMMARY

The present technology provides a hose which enables the direct bonding of a resin layer and a rubber layer without pretreatment prior to adhesion on the resin layer and/or the rubber layer and which has superior adhesion between a gas barrier layer and the rubber layer.

A hose for transporting refrigerant in which a resin layer and a rubber layer can be vulcanization-bonded without pretreatment prior to adhesion on the resin layer and/or the rubber layer and which has superior adhesion between a gas barrier layer and the rubber layer may be obtained through the following.

A hose for transporting refrigerant including an inner tube layer having a gas barrier layer and a rubber layer adjacent to an outer surface of the gas barrier layer, wherein the gas barrier layer is formed using a thermoplastic resin composition comprising a polyamide resin (A) and a modified rubber (B) having an acid anhydride group or an epoxy group, the modified rubber (B) being obtained by modifying a modified raw rubber having an acid anhydride group or an epoxy group with a hydrogen bond-forming compound (C) having a functional group which reacts with the acid anhydride group or the epoxy group and a functional group which is able to form a hydrogen bond with an amide bond or a hydroxyl group.

The rubber layer is formed using a rubber composition comprising from 1 to 15 parts by mass of an alkylphenol-formaldehyde resin per 100 parts by mass of a raw rubber. The raw rubber comprises at least one selected from the group consisting of a BIMS and a butyl rubber and/or a halogenated butyl rubber, which is a copolymer rubber. The raw rubber and/or the alkylphenol-formaldehyde resin has a halogen.

Specifically, the present technology provides the following 1 to 11.

1. A hose for transporting refrigerant including an inner tube layer having a gas barrier layer and a rubber layer adjacent to an outer surface of the gas barrier layer, wherein:

the gas barrier layer is formed using a thermoplastic resin composition comprising a polyamide resin (A) and a modified rubber (B) having an acid anhydride group or an epoxy group, the modified rubber (B) being obtained by modifying a modified raw rubber having an acid anhydride group or an epoxy group with a hydrogen bond-forming compound (C) having a functional group which reacts with the acid anhydride group or the epoxy group and a functional group which is able to form a hydrogen bond with an amide bond or a hydroxyl group;

the rubber layer is formed using a rubber composition comprising from 1 to 15 parts by mass of an alkylphenol-formaldehyde resin per 100 parts by mass of a raw rubber; the raw rubber comprises at least one selected from the group consisting of a BIMS and a butyl rubber and/or a halogenated butyl rubber, which is a copolymer rubber; the raw rubber and/or the alkylphenol-formaldehyde resin has a halogen; and there is no adhesive layer between the gas barrier layer and the rubber layer.

2. The hose for transporting refrigerant according to 1 described above, wherein: the functional group which reacts with the acid anhydride group or the epoxy group is at least one selected from the group consisting of amino groups, hydroxyl groups, carboxyl groups, and mercapto groups; and the functional group which is able to form a hydrogen bond with an amide bond or a hydroxyl group is at least one selected from the group consisting of sulfone groups, carbonyl groups, ether bonds, hydroxyl groups, and nitrogen-containing heterocycles.

3. The hose for transporting refrigerant according to 1 or 2 described above, wherein the rubber composition further comprises hydrotalcite, and an amount of the hydrotalcite is from 1 to 8 parts by mass per 100 parts by mass of the raw rubber.

4. The hose for transporting refrigerant according to one of 1 to 3 described above, wherein an amount of the hydrogen bond-forming compound (C) is from 0.1 to 5 parts by mass per 100 parts by mass of the modified raw rubber.

5. The hose for transporting refrigerant according to one of 1 to 4 described above, wherein the rubber composition further comprises from 30 to 80 parts by mass of a carbon black per 100 parts by mass of the raw rubber, the carbon black having $N_2SA$ that is greater than or equal to 75 $m^2/g$ and DBP (dibutyl phthalate) absorption number that is greater than or equal to 90 $cm^3/100$ g;

the raw rubber comprises a BIMS, a copolymer rubber (1) which is a butyl rubber and/or a halogenated butyl rubber, and EPDM (ethylene propylene diene monomer (M-class) rubber); and in the raw rubber, a content of the BIMS is from 5 to 40 parts by mass, a total content of the BIMS and the copolymer rubber (1) is from 20 to 80 parts by mass, and a content of the EPDM is from 80 to 20 parts by mass.

6. The hose for transporting refrigerant according to one of 1 to 5 described above, wherein the polyamide resin (A) contains a modified polyamide resin (A') obtained by melt-blending 100 parts by mass of a polyamide resin and from 0.05 to 5 parts by mass of a compound (D) which is able to bond with a terminal amino group of the polyamide resin, at a higher temperature than or equal to the melting point of the polyamide resin.

7. The hose for transporting refrigerant according to one of 1 to 6 described above, wherein the thermoplastic resin composition further comprises an ethylene-vinyl alcohol copolymer (E).

8. The hose for transporting refrigerant according to one of 1 to 7 described above, wherein an amount of the modified raw rubber is from 90 to 175 parts by mass per 100 parts by mass of the polyamide resin (A) or per 100 parts by mass of a total of the polyamide resin (A) and the ethylene-vinyl alcohol copolymer (E).

9. The hose for transporting refrigerant according to 7 or 8 described above, wherein a mass ratio of the polyamide resin (A) to the ethylene-vinyl alcohol copolymer (E) [polyamide resin (A)/ethylene-vinyl alcohol copolymer (E)] is from 90/10 to 10/90.

10. The hose for transporting refrigerant according to one of 1 to 9 described above, wherein a reinforcing layer is provided on the inner tube layer and an outer tube layer is provided on the reinforcing layer.

11. A manufacturing method of a hose for transporting refrigerant in which the hose for transporting refrigerant described in any one of 1 to 10 above is manufactured by: laminating the thermoplastic resin composition and the rubber composition, and bonding the thermoplastic resin composition and the rubber composition by vulcanization and/or crosslinking.

The hose for transporting refrigerant of the present technology enables the direct bonding of a resin layer and a rubber layer without pretreatment prior to adhesion on the resin layer and/or the rubber layer and has superior adhesion between a gas barrier layer and the rubber layer.

DETAILED DESCRIPTION

Figure 1:
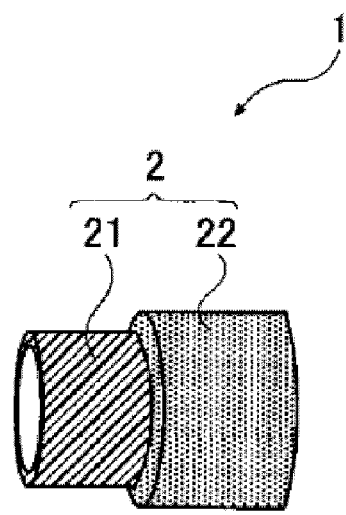
FIG. 1 is a perspective view which schematically shows a preferred embodiment of the hose of the present technology.

The present technology will be described in detail below.

The hose for transporting refrigerant of the present technology is a hose for transporting refrigerant including an inner tube layer having a gas barrier layer and a rubber layer adjacent to the outer surface of the gas barrier layer, wherein:

the gas barrier layer is formed using a thermoplastic resin composition comprising a polyamide resin (A) and a modified rubber (B) having an acid anhydride group or an epoxy group, the modified rubber (B) being obtained by modifying a modified raw rubber having an acid anhydride group or an epoxy group with a hydrogen bond-forming compound (C) having a functional group which reacts with the acid anhydride group or the epoxy group and a functional group which is able to form a hydrogen bond with an amide bond or a hydroxyl group;

the rubber layer is formed using a rubber composition comprising from 1 to 15 parts by mass of an alkylphenol-formaldehyde resin per 100 parts by mass of a raw rubber; the raw rubber comprises at least one selected from the group consisting of a BIMS and a butyl rubber and/or a halogenated butyl rubber, which is a copolymer rubber; the raw rubber and/or the alkylphenol-formaldehyde resin has a halogen; and there is no adhesive layer between the gas barrier layer and the rubber layer.

Hereinafter, the hose for transporting refrigerant of the present technology may be referred to as the "hose of the present technology".

In the present technology, the description that the raw rubber and/or the alkylphenol-formaldehyde resin has a halogen means that the raw rubber and/or the alkylphenol-formaldehyde resin is halogenated (for example, chlorinated or brominated).

The bonding mechanism between the gas barrier layer and the rubber layer may be such that the resin and rubber can bond directly as a result of a reaction between the modified rubber (B) having an acid anhydride group or an epoxy group as the rubber component contained in the thermoplastic resin composition used to form the gas barrier layer and a halogen (for example, bromine) of the raw rubber and/or the alkylphenol-formaldehyde resin blended with the rubber composition used to form the adjacent rubber layer.

In this way, when the rubber layer contains a halogen and the gas barrier layer contains an acid anhydride group or an epoxy group, it is possible to firmly bond the gas barrier layer and the rubber layer [by vulcanization and/or crosslinking or heating, for example] without using an adhesive, thereby expressing high adhesion (high adhesive strength and high rubber sticking).

In addition, when hydrotalcite is further blended with the rubber composition, hydrotalcite, which is a powerful halogen catcher, catches the halogen blended into the rubber layer side [for example, the halogen (for example, a chlorine atom or a bromine atom) of the halogenated butyl rubber, BIMS, or halogenated alkylphenol-formaldehyde resin] (that is, hydrotalcite aggressively draws the halogen out from the halide). As a result, the reacting amount of the rubber layer and the modified rubber (B) having an acid anhydride group or an epoxy group contained in the gas barrier layer increases, making it possible to further improve the resin/rubber bond strength.

The hose of the present technology is a hose for transporting refrigerant including an inner tube layer having a gas barrier layer and a rubber layer adjacent to the outer surface of the gas barrier layer. The present technology does not have an adhesive layer (a layer formed using an adhesive, for example) between the gas barrier layer and the rubber layer. That is, there is no adhesive layer present between the gas barrier layer and the rubber layer. The gas barrier layer and the rubber layer can be bonded directly in the present technology.

The hose of the present technology includes cases in which the hose consists of only an inner tube layer and does not have other layers. The configuration of the hose of the present technology is not particularly limited as long as the hose includes an inner tube layer having a gas barrier layer and a rubber layer adjacent to the outer surface of the gas barrier layer. For example, in addition to the inner tube layer, the hose may have a reinforcing layer or an outer tube layer. An example of a preferable form of the hose of the present technology is one in which a reinforcing layer is provided on the inner tube layer, and an outer tube layer is provided on the reinforcing layer.

Next, a description of the hose of the present technology will be given with reference to the attached drawing. The present technology is not limited to the attached drawings. In the attached drawings, the hose is shown in a state in which each layer is cut out.

FIG. 1 is a perspective view which schematically shows a preferred embodiment of the hose of the present technology. In FIG. 1, a hose 1 of the present technology comprises only an inner tube layer 2 comprising a gas barrier layer 21 and a rubber layer 22 adjacent to the outer surface of the gas barrier layer 21.

Figure 2:
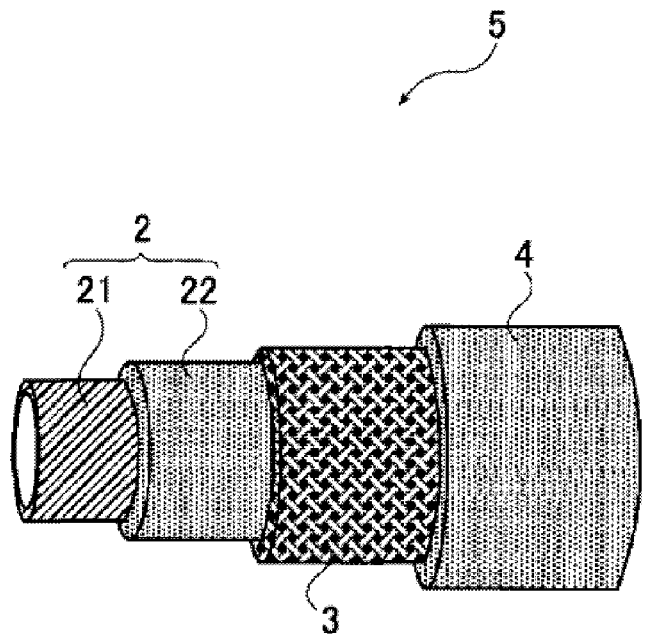
FIG. 2 is a perspective view which schematically shows another preferred embodiment of the hose of the present technology.

FIG. 2 is a perspective view which schematically shows another preferred embodiment of the hose of the present technology. In FIG. 2, a hose 5 of the present technology has an inner tube layer 2 comprising a gas barrier layer 21 and a rubber layer 22 adjacent to the outer surface of the gas barrier layer 21, a reinforcing layer 3 on the top surface of the rubber layer 22, and an outer tube layer 4 on the top surface of the reinforcing layer 3.

The hose of the present technology is not particularly limited as long as the hose has the inner tube layer described above. For example, the hose may also have other layers on the outside of the outer tube layer in the preferred embodiment described using FIG. 2.

While it is not necessary that the hose of the present technology include the reinforcing layer described above, it is preferable that the reinforcing layer is included because the tensile breaking strength, usable range of pressure, and attachability of fittings of the hose will be enhanced. Particularly, when the hose of the present technology is used to transport high-pressure fluids, the reinforcing layer is preferably included.

The gas barrier layer will be described hereinafter.

In the hose of the present technology, the gas barrier layer is formed using a thermoplastic resin composition comprising a polyamide resin (A) and a modified rubber (B) having an acid anhydride group or an epoxy group, the modified rubber (B) being obtained by modifying a modified raw rubber having an acid anhydride group or an epoxy group with a hydrogen bond-forming compound (C) having a functional group which reacts with the acid anhydride group or the epoxy group and a functional group which is able to form a hydrogen bond with an amide bond or a hydroxyl group.

With the present technology, by modifying the modified raw rubber with the hydrogen bond-forming compound (C), the interface of the polyamide resin (A) forming a matrix and the dispersion phase of the modified rubber (B) is reinforced by hydrogen bonds, so it is possible to improve the low-temperature durability of the thermoplastic resin composition without diminishing the film formability. In the present technology, the gas barrier layer formed using a thermoplastic resin composition and the rubber layer formed using a rubber composition can be bonded, which yields superior adhesion between the gas barrier layer and the rubber layer.

The thermoplastic resin composition used when forming (manufacturing) the gas barrier layer comprises a polyamide resin (A) and a modified rubber (B) having an acid anhydride group or an epoxy group, the modified rubber (B) being obtained by modifying a modified raw rubber having an acid anhydride group or an epoxy group with a hydrogen bond-forming compound (C) having a functional group which reacts with the acid anhydride group or the epoxy group and a functional group which is able to form a hydrogen bond with an amide bond or a hydroxyl group.

The polyamide resin (A) contained in the thermoplastic resin composition is not particularly limited as long as the resin is a polymer having an amide bond. Examples include polyamide resins such as nylon 11, nylon 12, nylon 6, nylon 66, nylon 666, nylon 612, nylon 610, nylon 46, nylon 66612, and aromatic nylons. Among these, nylon 6 and nylon 666 are preferable from the perspective of the combination of fatigue resistance and gas barrier properties.

An example of the polyamide resin (A) is a modified polyamide resin obtained by melt-blending a polyamide resin and a compound (D) which is able to bond with an amino group (for example, terminal amino group: $-NH_2$) of the polyamide resin. The polyamide resin (A) may contain a modified polyamide resin. The polyamide resin (A) preferably contains at least a modified polyamide resin obtained by melt-blending a polyamide resin and a compound (D) which is able to bond with an amino group of the polyamide resin from the perspective of allowing the polyamide resin (A) to be filled with a high level of the modified rubber (B) and the perspective of achieving superior adhesion between the gas barrier layer and the rubber layer. Further, when the polyamide resin (A) also contains at least a modified polyamide resin, the reaction between the modified raw rubber [or the modified rubber (B)] and the amino group (terminal amino group) of the polyamide occurring during the mixing of the polyamide resin (A) and the modified raw rubber [or the modified rubber (B)] is suppressed. It is therefore possible to more effectively form a hydrogen bond on the interface of the matrix resin and the modified rubber dispersion phase. As a result, it is possible to further improve the low-temperature durability of the thermoplastic resin composition without diminishing the film formability.

In addition, when the polyamide resin (A) contains at least a modified polyamide resin, the reaction between the modified raw rubber [or the modified rubber (B)] and the amino group (terminal amino group) of the polyamide is suppressed, which makes it possible to obtain a fluid thermoplastic resin composition. When such a thermoplastic resin composition is used, the thermoplastic resin composition can be easily extruded into a film shape or a tube shape (the thickness of the film or tube is approximately 150 μm).

The polyamide resin used when manufacturing the modified polyamide resin is not particularly limited. For example, the same polyamide resins as those described above may be used.

Examples of the compound (D) which is able to bond with an amino group of the polyamide resin include monofunctional epoxy compounds, isocyanate group-containing compounds, acid anhydride group-containing compounds, and halogenated alkyl group-containing compounds. Monofunctional epoxy compounds are preferable from the perspective of achieving superior reactivity with the amino group (terminal amino group) of the polyamide resin.

Examples of monofunctional epoxy compounds include ethylene oxide, epoxypropane, 1,2-epoxybutane, 2,3-epoxybutane, 3-methyl-1,2-epoxybutane, 1,2-epoxypentane, 4-methyl-1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 5-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-propyl-2,3-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 6-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-1-hexanol, 3,4-epoxy-5-methyl-2-hexanol, 3,4-epoxy-5,5-dimethyl-2-hexanol, 3,4-epoxy-3-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-3-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-5-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, 1,2-epoxycyclododecane, 3,4-epoxycyclopentene, 3,4-epoxycyclohexene, 3,4-epoxycycloheptene, 3,4-epoxycyclooctene, 3,4-epoxynonene, 1,2-epoxycyclodecene, 1,2-epoxycycloundecene, 1,2-epoxycyclododecene, 1-butoxy-2,3-epoxypropane, 1-allyloxy-2,3-epoxypropane, polyethylene glycol butyl glycidyl ether, 2-ethylhexyl glycidyl ether, phenyl glycidyl ether, and p-sec-butylphenyl glycidyl ether. Among these, an epoxy compound having from 3 to 20 carbons, preferably from 3 to 13 carbons, and having an ether and/or hydroxyl group is particularly preferable from the perspective of achieving superior compatibility with the polyamide resin.

Each compound (D) may be used alone or in a combination of two or more compounds (D).

The amount of the compound (D) is preferably from 0.05 to 5 parts by mass and more preferably from 1 to 3 parts by mass per 100 parts by mass of the polyamide resin. If the amount of the compound (D) which is able to bond with an amino group (terminal amino group) of the polyamide resin is too small, the effect of improving the fluidity when filling the modified rubber (B) to a high degree will be small, which is not preferable. Conversely, when the amount is too large, the low-temperature durability (repeated fatigue properties) of the polyamide resin will be diminished, which is not preferable.

An example of a method for manufacturing the modified polyamide resin is a method of loading a polyamide resin and a compound (D) into a twin-screw kneader and melt-blending at a higher temperature than or equal to the melting point of the polyamide resin and preferably a temperature at least 20° C. higher than the melting point such as 240° C., for example. The amount of time of melt-blending is, for example, from 1 to 10 minutes and preferably from 2 to 5 minutes.

When a monofunctional epoxy compound is used as the compound (D), two monofunctional epoxy compounds bond with the amino group (terminal amino group) of the polyamide resin, and the amino group changes as follows, for example.

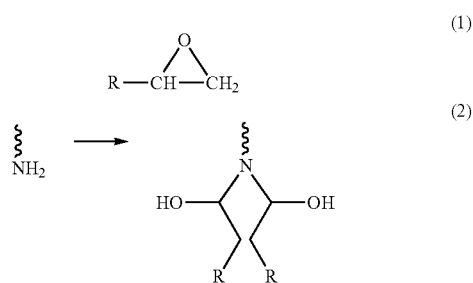

The amino group (terminal amino group) of the polyamide resin is eliminated or reduced by this reaction, so the fluidity is maintained even when the modified polyamide resin is filled to a high level with the modified raw rubber [or the modified rubber (B)] having an acid anhydride group or an epoxy group, which enables film formation.

The modified rubber (B) contained in the thermoplastic resin composition is obtained by modifying a modified raw rubber having an acid anhydride group or an epoxy group with a hydrogen bond-forming compound (C) having a functional group which reacts with the acid anhydride group or the epoxy group and a functional group which is able to form a hydrogen bond with an amide bond or a hydroxyl group, and the modified rubber (B) has an acid anhydride group or an epoxy group.

When the modified rubber (B) is modified by the hydrogen bond-forming compound (C), the interface of the resin forming a matrix and the modified rubber dispersion phase is reinforced by hydrogen bonds, so it is possible to improve the low-temperature durability of the thermoplastic resin composition without diminishing the film formability.

In the present technology, the modified rubber (B) has an acid anhydride group or an epoxy group. The modified rubber (B) particularly preferably has an acid anhydride group from the perspective of achieving superior compatibility with the polyamide resin (A) and superior adhesion between the gas barrier layer and the rubber layer.

Examples of rubbers which can be used when manufacturing a modified raw rubber having an acid anhydride group or an epoxy group [rubber constituting the modified rubber (B)] include ethylene-α-olefin copolymers, ethylene-unsaturated carboxylic acid copolymers, or derivatives thereof. Examples of ethylene-α-olefin copolymers include ethylene-propylene copolymers, ethylene-butene copolymers, ethylene-hexene copolymers, and ethylene-octene copolymers. Examples of ethylene-unsaturated carboxylic acid copolymers or derivatives thereof include ethylene-acrylic acid copolymers, ethylene-methacrylic acid copolymers, ethylene-methyl acrylate copolymers, and ethylene-methyl methacrylate copolymers.

The modified raw rubber having an acid anhydride group can be manufactured, for example, by reacting an acid anhydride and peroxide with a rubber. Modified raw rubbers having acid anhydride groups are also commercially available, and a commercially available product may be used. Examples of commercially available products include a maleic anhydride modified ethylene-propylene copolymer (TAFMER (registered trademark) MP-0620) and a maleic anhydride modified ethylene-butene copolymer (TAFMER (registered trademark) MP-7020) manufactured by Mitsui Chemicals, Inc.

The modified raw rubber having an epoxy group can be manufactured, for example, by copolymerizing glycidyl methacrylate with rubber. Modified raw rubbers having epoxy groups are also commercially available, and a commercially available product may be used. Examples of a commercially available product include an epoxy modified ethylene methyl acrylate copolymer (ESPLENE (registered trademark) EMA2752) manufactured by Sumitomo Chemical Co., Ltd.

A particularly preferable modified raw rubber is an ethylene-α-olefin copolymer graft-modified with an acid anhydride group, and examples thereof include the aforementioned maleic anhydride modified ethylene-propylene copolymer (TAFMER (registered trademark) MP-0620) manufactured by Mitsui Chemicals, Inc.

The amount of the modified raw rubber is preferably from 90 to 175 parts by mass and more preferably from 95 to 155 parts by mass per 100 parts by mass of the polyamide resin (A) from the perspective of achieving superior adhesion between the gas barrier layer and the rubber layer and achieving a superior balance between the barrier performance and flexibility of the gas barrier layer. If the amount of the modified raw rubber is too small, the low-temperature durability will be diminished, whereas if the amount is too large, the fluidity at the time of melting will drop dramatically, which will cause the film formability to be diminished significantly.

The hydrogen bond-forming compound (C) used when manufacturing the modified rubber (B) is a compound having a functional group which reacts with the acid anhydride group or the epoxy group and a functional group which is able to form a hydrogen bond with an amide bond or a hydroxyl group.

Examples of functional groups which react with acid anhydride groups or epoxy groups include amino groups, hydroxyl groups, carboxyl groups, and mercapto groups.

Examples of functional groups which is able to form hydrogen bonds with amide bonds or hydroxyl groups include sulfone groups, carbonyl groups, ether groups, hydroxyl groups, and nitrogen-containing heterocycles.

Among these, a compound having an amino group and/or a hydroxyl group as a functional group which reacts with the acid anhydride group or the epoxy group and having a sulfone group, a carbonyl group, and/or a nitrogen-containing heterocycle as a functional group which is able to form a hydrogen bond with an amide bond or a hydroxyl group is preferable from the perspective of achieving superior adhesion between the gas barrier layer and the rubber layer.

Examples of the hydrogen bond-forming compound (C) include 3,3'-diaminodiphenylsulfone, 4,4'-diaminodiphenylsulfone, 1,3-bis(3-aminophenoxy)benzene, 3,3'-diamino-4,4'-dihydroxydiphenylsulfone, (4-(4-aminobenzoyl)oxyphenyl)4-aminobenzoate, 3-amino-1,2-4-triazole, and tris(2-hydroxyethyl)isocyanurate. Among these, 3,3'-diaminodiphenylsulfone, tris(2-hydroxyethyl)isocyanurate, and 3-amino-1,2-4-triazole are preferable from the perspectives of cost, safety, and the improvement of low-temperature durability.

When a compound having two or more amino groups is used as the hydrogen bond-forming compound (C), the compound also functions as a crosslinking agent. When the modified raw rubber and the compound (C) are melt-blended, the modified raw rubber is dynamically crosslinked, and viscosity of the modified raw rubber [or the modified rubber (B)] phase increases further with respect to the resin phase [polyamide resin (A)]. This promotes the island phase formation of the modified raw rubber [or the modified rubber (B)] phase and may also have the effect of fixing the dispersed state of the modified raw rubber [or the modified rubber (B)] in the thermoplastic composition. As a result, the fine dispersion of the modified raw rubber [or the modified rubber (B)] is maintained, and the fluidity is maintained even when the modified raw rubber [or the modified rubber (B)] is filled to a high level, which enables film formation and makes it possible to obtain a thermoplastic resin composition with superior low-temperature durability The amount of the hydrogen bond-forming compound (C) is preferably from 0.1 to 5 parts by mass and more preferably from 0.5 to 3 parts by mass per 100 parts by mass of the modified raw rubber from the perspective of achieving superior adhesion between the gas barrier layer and the rubber layer and achieving a superior balance between the barrier performance and flexibility of the gas barrier layer. If the amount of the hydrogen bond-forming compound (C) is too small, the reinforcement of the interface between the matrix resin and the dispersion rubber by hydrogen bonds will be insufficient, which will make it impossible to maintain the fine dispersion of the modified raw rubber [or the modified rubber (B)] and will diminish the durability and gas barrier properties. Conversely, the durability will also be diminished if the amount of the hydrogen bond-forming compound (C) is too large, which is not preferable.

The manufacture of the modified rubber (B) [modification of the modified raw rubber by the hydrogen bond-forming compound (C)] can be accomplished, for example, by melt-blending the modified raw rubber having an acid anhydride group or an epoxy group (in the polyamide resin (A), for example) together with the hydrogen bond-forming compound (C) using a twin-screw kneader. The melt-blending temperature may be a higher temperature than or equal to the melting point of the polyamide resin (A) and is preferably a temperature 20° C. higher than the melting point of the polyamide resin such as from 200 to 250° C., for example. The amount of time of melt-blending is ordinarily from 1 to 10 minutes and preferably from 2 to 5 minutes.

In the thermoplastic resin composition, it is preferable for the polyamide resin (A) to form a continuous phase and for the modified rubber (B) to form a dispersion phase from the perspective of achieving a superior balance between the gas barrier performance and the low-temperature durability.

It is preferable for the thermoplastic resin composition to further contain an ethylene-vinyl alcohol copolymer (E). The gas barrier properties of the thermoplastic resin composition can be improved by adding the ethylene-vinyl alcohol copolymer. The ethylene-vinyl alcohol copolymer to be used is not particularly limited, and a commercially available product may be used. For example, EVAL manufactured by Kuraray Co., Ltd. and Soarnol manufactured by Nippon Synthetic Chemical Industry Co., Ltd. can be used.

When the thermoplastic resin composition further includes the ethylene-vinyl alcohol copolymer (E), the mass ratio of the polyamide resin (A) to the ethylene-vinyl alcohol copolymer (E) [polyamide resin (A)/ethylene-vinyl alcohol copolymer (E)] is preferably from 90/10 to 10/90 and more preferably from 80/20 to 20/80. If the amount of the ethylene-vinyl alcohol copolymer (E) is too small, little improvement can be seen in the gas barrier properties, whereas if the amount is too large, the low-temperature durability will be diminished dramatically, which is not preferable.

When the thermoplastic resin composition further includes the ethylene-vinyl alcohol copolymer (E), the amount of the modified raw rubber is preferably from 90 to 175 parts by mass and more preferably from 95 to 155 parts by mass per 100 parts by mass of the total of the polyamide resin (A) and the ethylene-vinyl alcohol copolymer (E). If the amount of the modified raw rubber is too small, the low-temperature durability will be diminished, whereas if the amount is too large, the fluidity will drop dramatically, which will cause the film formability to be diminished significantly.

The thermoplastic resin composition may further contain a plasticizer. The plasticizer is not particularly limited. When manufacturing the thermoplastic resin composition, the timing of the addition of the plasticizer is not particularly limited, but it is preferable to add and knead the plasticizer into the polyamide resin (A) in advance.

The thermoplastic resin composition may further contain hydrotalcite. The hydrotalcite is not particularly limited. The hydrotalcite is synonymous with the hydrotalcite described in the rubber composition below.

In addition to the components described above, additives which are typically used for resins and rubber compositions including other reinforcing agents (fillers) such as carbon black or silica, vulcanizing agents or crosslinking agents, vulcanization or crosslinking accelerators, various oils, and antiaging agents may also be added to the thermoplastic resin composition. The compounded amounts of the additives may be any conventional standard amounts as long as the amounts do not depart from the intended purpose of the present technology.

When the thermoplastic resin composition further contains the ethylene-vinyl alcohol copolymer (E), the thermoplastic resin composition of the present technology can be manufactured, for example, by melt-blending the polyamide resin (A), the ethylene-vinyl alcohol copolymer (E), and the modified rubber (B) [or the modified raw rubber and the hydrogen bond-forming compound (C)].

The timing of the addition of the hydrogen bond-forming compound (C) may be simultaneous with melt-blending of the polyamide resin (A) and the modified raw rubber or may be after the melt-blending of the polyamide resin (A) and the modified raw rubber. That is, the polyamide resin (A), the modified raw rubber, and the hydrogen bond-forming compound (C) may be melt-blended simultaneously, or the polyamide resin (A) and the modified raw rubber may be melt-blended and the hydrogen bond-forming compound (C) may be added and further melt-blended at the point when the modified raw rubber has sufficiently dispersed into the polyamide resin (A). It is preferable for the polyamide resin (A) and the modified raw rubber to be melt-blended and for the hydrogen bond-forming compound (C) to be added and further melt-blended at the point when the modified raw rubber has sufficiently dispersed into the polyamide resin (A).

The melt-blending temperature may be a higher temperature than or equal to the melting point of the polyamide resin but is preferably a temperature 20° C. higher than the melting point of the polyamide resin such as from 200 to 250° C., for example. The amount of time of melt-blending is ordinarily from 1 to 10 minutes and preferably from 2 to 5 minutes.

When a modified polyamide resin is used as the polyamide resin (A), the thermoplastic resin composition can be manufactured, for example, by melt-blending 100 parts by mass of the polyamide resin and from 0.05 to 5 parts by mass of the compound (D) which is able to bond with an amino group of the polyamide resin in advance to prepare a modified polyamide resin (A') and melt-blending the modified polyamide resin (A') together with the modified rubber (B) modified in advance with the hydrogen bond-forming compound (C) or melt-blending the modified polyamide resin (A') together with the modified raw rubber and the hydrogen bond-forming compound (C).

When the thermoplastic resin composition uses a modified polyamide resin as the polyamide resin (A) and further contains the ethylene-vinyl alcohol copolymer (E), the ethylene-vinyl alcohol copolymer (E) is preferably added simultaneously with the polyamide resin or the modified polyamide resin A typical manufacturing method of the thermoplastic resin composition is, for example, as follows.

First, the polyamide resin, the compound (D) which is able to bond with an amino group (terminal amino group) of the polyamide resin, and a plasticizer are kneaded with a twin-screw kneader at a preset temperature of from 200 to 250° C. for from 1 to 10 minutes to prepare the modified polyamide resin. Next, the prepared modified polyamide resin and the modified raw rubber are loaded into the twin-screw kneader at the preset temperature of from 200 to 250° C. After the modified raw rubber is dispersed into the system, the hydrogen bond-forming compound (C) is loaded to modify the modified raw rubber, and, finally, other additives are added.

When the thermoplastic resin composition further contains the ethylene-vinyl alcohol copolymer (E), for example, the polyamide resin, the compound (D) which is able to bond with an amino group (terminal amino group) of the polyamide resin, and a plasticizer are kneaded with a twin-screw kneader at a preset temperature of from 200 to 250° C. for from 1 to 10 minutes to prepare the modified polyamide resin. Next, the prepared modified polyamide resin, the ethylene-vinyl alcohol copolymer (E), and the modified raw rubber are loaded into the twin-screw kneader at the preset temperature of from 200 to 250° C. After the modified raw rubber is dispersed into the system, the hydrogen bond-forming compound (C) is loaded to modify the modified raw rubber, and, finally, other additives are added.

The thermoplastic resin composition may be formed into a layer such as a film with a T-die equipped extruder, an inflation molding apparatus, or the like.

Since the layer (film) obtained using the thermoplastic resin composition has superior adhesion with the rubber having a halogen as well as superior gas barrier properties, heat resistance, and bending fatigue resistance, the layer can be suitably used as the innermost layers of the hose for transporting refrigerant and the inner liners of pneumatic tires. In addition, the layer (film) obtained using the thermoplastic resin composition can be laminated with a rubber composition sheet containing a halogen or a diene to form a laminate.

The gas barrier layer can be formed by extruding and molding the thermoplastic resin composition into a tube shape, for example. The extrusion and molding method is not particularly limited. Examples thereof include conventionally known methods.

The thickness of the gas barrier layer is not particularly limited but is preferably from 0.01 to 0.50 mm, more preferably from 0.05 to 0.30 mm, and even more preferably from 0.05 to 0.20 mm. The moldability, refrigerant permeation resistance, and flexibility tend to be better when the thickness is within this range.

The Young's modulus of a cured product formed from the thermoplastic resin composition is preferably at most 300 MPa and more preferably at most 270 MPa.

When the Young's modulus of the cured product is at most 300 MPa, the flexibility and vibration transmission resistance are superior. If the Young's modulus of the cured product exceeds 300 MPa, the flexural rigidity of the hose itself will increase, and the manageability in an engine room will be diminished. The vibration of a compressor used to compress the refrigerant will be transmitted to the body side of the vehicle, making the vehicle susceptible to problems related to vibration and noise.

In the present technology, the Young's modulus of the cured product can be set to at most 300 MPa by setting the components to within the compounding ranges of the present technology.

In the present technology, the Young's modulus was measured in accordance with JIS (Japanese Industrial Standard) 7161 as follows. A sheet was prepared at a temperature of 230° C. using the thermoplastic resin composition, and a test piece (test piece of working examples) with dimensions of 5 mm (width)×80 mm (length)×0.15 mm (thickness) was cut out from the sheet. Measurements were performed at a pulling speed of 50 mm/minute for the resulting test sample.

<Rubber Layer>

The rubber layer will be described below.

The rubber layer is formed using a rubber composition comprising from 1 to 15 parts by mass of an alkylphenol-formaldehyde resin per 100 parts by mass of a raw rubber.

The raw rubber comprises at least one selected from the group consisting of a BIMS and a butyl rubber and/or a halogenated butyl rubber, which is a copolymer rubber, and the raw rubber and/or the alkylphenol-formaldehyde resin has a halogen.

The raw rubber contained in the rubber composition comprises at least one selected from the group consisting of a BIMS and a butyl rubber and/or a halogenated butyl rubber, which is a copolymer rubber. The raw rubber can be made crosslinkable by using a phenol-based resin.

Next, the BIMS can be included in the raw rubber will be described.

BIMS is a bromide of a copolymer rubber of p-alkylstyrene and isomonoolefin. Examples of the BIMS include a bromide of a copolymer rubber of p-alkylstyrene and an isomonoolefin having from 4 to 7 carbon atoms, wherein a content of the p-alkylstyrene (PAS) is from 5 to 25 mass %, the content of bromine (Br) is at least 1.5 mass %, and the mass ratio of the p-alkylstyrene unit to the bromine unit is such that $0.15 \leq Br/PAS \leq 0.40$. Specific examples thereof include a brominated isobutylene-p-methylstyrene copolymer rubber. The Mooney viscosity (ML1+8, 125° C.) of the BIMS is at least 30.

Examples of the isomonoolefin having from 4 to 7 carbons include isobutylene. Examples of the p-alkylstyrene include styrenes having an alkyl group having from 1 to 5 carbons at the para position such as p-methylstyrene and p-ethylstyrene. In all components having a p-alkylstyrene backbone, including the bromide of the alkyl group of the p-alkylstyrene, the content of the p-alkylstyrene in the BIMS is from 5 to 25 mass % and preferably from 5 to 10 mass %. Refrigerant permeation resistance and the like will be superior if the content is at least 5 mass %. In addition, the rubber composition will not become brittle at low temperature and low temperature resistance will be superior if the content of the p-alkylstyrene is at most 25 mass %.

BIMS is a commercially available product, and examples thereof include the EXXPRO series manufactured by Exxon-Mobil Chemical Company. Specific examples include Exxpro 3745, manufactured by the same, which is a bromide of a copolymer rubber of isobutylene and p-methylstyrene.

The butyl rubber and halogenated butyl rubber serving as a copolymer rubber which can be included in the raw rubber will be described below.

The raw rubber can contain a butyl rubber and/or a halogenated butyl rubber and preferably contains a halogenated butyl rubber. This is because the adhesion of the obtained butyl rubber of the present technology will be superior and the durability will be enhanced.

The butyl rubber is not particularly limited, and a conventional copolymer (rubber) of isobutylene and isoprene can be used as the butyl rubber, but the content of the isoprene is preferably from 0.6 to 2.5 mol % as a degree of unsaturation, and the molecular weight is preferably from 35 to 60 (at 125° C.) in terms of the Mooney viscosity.

Examples of the halogenated butyl rubber include chlorinated butyl rubber and brominated butyl rubber. Conventional halogenated butyl rubbers can be used as well, and when a chlorinated butyl rubber is used, the chlorine content is preferably from 1 to 2.5 mass %, the content of the isoprene is preferably from 0.6 to 2.5 mol % as a degree of unsaturation, and the molecular weight is preferably from 30 to 60 (at 125° C.) in terms of the Mooney viscosity. When a brominated butyl rubber is used, the bromine content is preferably from 1 to 2.5 mass %, the content of the isoprene is preferably from 0.6 to 2.5 mol % as a degree of unsaturation, and the molecular weight is preferably from 25 to 55 (at 125° C.) in terms of the Mooney viscosity.

The raw rubber can further include an EPDM.

The EPDM that can be further included in the raw rubber is not particularly limited as long as it is a conventional copolymer rubber obtained by polymerizing a monomer containing an ethylene, propylene, and diene. Examples of commercially available products include Mitsui EPT 4070 manufactured by Mitsui Chemicals, Inc. The propylene content is preferably from 10 to 70 mol % and more preferably from 15 to 50 mol %. Examples of the diene component include ethylidene norbornene, dicyclopentadiene, and 1,4-hexadiene. Among these, ethylidene norbornene, which has a high crosslinking rate, is preferable. The amount of the diene component is preferably from 3 to 25 and more preferably from 5 to 20 as an iodine value.

The combination of raw rubbers preferably includes a BIMS, a butyl rubber and/or a halogenated butyl rubber [copolymer rubber (1)] as well as EPDM from the perspective of achieving superior adhesion between the gas barrier layer and the rubber layer and superior balance of the gas barrier performance of the rubber layer itself.

From the perspective of obtaining superior adhesion between the gas barrier layer and the rubber layer, the content of the BIMS in the raw rubber is preferably from 5 to 40 parts by mass.

From the perspective of obtaining superior adhesion between the gas barrier layer and the rubber layer, the total content of the BIMS and the copolymer rubber (1), which is a butyl rubber and/or a halogenated butyl rubber, in the raw rubber is preferably from 20 to 80 parts by mass.

From the perspective of obtaining superior adhesion between the gas barrier layer and the rubber layer, the content of the EPDM in the raw rubber is preferably from 80 to 20 parts by mass.

If the content of the BIMS is less than 5 parts by mass, it will be difficult to achieve the necessary rubber sticking. That is, it will be difficult to form an adhesive rubber layer having the necessary thickness on the surface of the gas barrier layer (rubber sticking is evaluated hereinafter). Likewise, if the content exceeds 40 parts by mass, it will be difficult to obtain the necessary adhesive strength. That is, it will be difficult to firmly bond the rubber layer to the surface of the gas barrier layer.

In addition, the content of the EPDM is more preferably from 70 to 50 parts by mass. If the content of the EPDM is less than 20 parts by mass, it will be difficult to achieve the necessary adhesive strength and rubber sticking. Likewise, if the content exceeds 80 parts by mass, the vulcanization rate will decrease, and the productivity of the hose will be diminished.

Next, the alkylphenol-formaldehyde resin will be described.

The alkylphenol-formaldehyde resin acts as a crosslinking agent of the raw rubber and is capable of crosslinking the raw rubber.

Halogenated alkylphenol-formaldehyde resins are also included in the alkylphenol-formaldehyde resin. Among these, from the perspective of achieving superior adhesion between the gas barrier layer and the rubber layer, a halogenated alkylphenol-formaldehyde resin is preferable, and a brominated alkylphenol-formaldehyde resin is more preferable.

Examples of the alkylphenol-formaldehyde resin that can be used include commercially available products such as Tackirol 250-I manufactured by Taoka Chemical Co., Ltd.

From the perspective of achieving superior adhesion between the gas barrier layer and the rubber layer, the compounded amount of the alkylphenol-formaldehyde resin is from 1 to 15 parts by mass, preferably from 2 to 10 parts by mass, and more preferably from 2 to 7 parts by mass per 100 parts by mass of the raw rubber. If the compounded amount is less than 1 part by mass, it may be difficult to achieve the necessary adhesive strength. That is, it may be difficult to firmly bond the rubber layer to the surface of the gas barrier layer. Likewise, if the compounded amount exceeds 15 parts by mass, the physical properties (hardness) of the rubber layer may be lost.

The rubber composition may further contain hydrotalcite. The rubber composition preferably contains hydrotalcite from the perspective of achieving superior adhesion between the gas barrier layer and the rubber layer.

The hydrotalcite that can be further contained in the rubber composition is not particularly limited. The hydrotalcite may be a natural or a synthetic hydrotalcite. Specific examples thereof include:

$Mg_3ZnAl_2(OH)_{12}CO_3 \cdot wH_2O$ (where w is a positive real number);

$Mg_xAl_y(OH)_{2x+3y-2}CO_3 \cdot wH_2O$ (where x is from 1 to 10, y is from 1 to 10, and w is a positive real number);

$Mg_xAl_y(OH)_{2x+3y-2}CO_3$ [where x is from 1 to 10 and y is from 1 to 10; a specific example thereof being $Mg_{4.3}Al_2(OH)_{12.6}CO_3$ (trade name DHT-4A-2; manufactured by Kyowa Chemical Industry Co., Ltd.)]; and $Mg_{1-x}Al_xO_{3.83x}$ ($0.2 \leq x < 0.5$; a specific example thereof being $Mg_{0.7}Al_{0.3}O_{1.15}$ (trade name KW-2200; manufactured by Kyowa Chemical Industry Co., Ltd.)).

Among these hydrotalcites, from the perspectives of achieving superior adhesion between the gas barrier layer and the rubber layer and the high halogen catching capacity, hydrotalcites with low OH content (for example, a non-hydrate without $wH_2O$ in the formula above) such as $Mg_{1-x}Al_xO_{3.83x}$ are preferable, and $Mg_{0.7}Al_{0.3}O_{1.15}$ is more preferable. The hydrotalcite having a low OH content in the chemical structure can be manufactured, for example, by calcining (at a high temperature) a raw hydrotalcite (for example, a hydrotalcite obtained via synthesis).

A commercially available product can be used as the hydrotalcite. Examples of commercially available hydrotalcites include the DHT series (DHT-4A and DHT-4A-2: calcination treatment is performed, but the products are not ignited to the extent of KW-2200 of the KW series described below; DHT-4C) manufactured by Kyowa Chemical Industry Co., Ltd., the KW series also manufactured by Kyowa Chemical Industry Co., Ltd. (a grade resulting from performing calcination treatment at a higher temperature than for the DHT series; the halogen catching capacity tends to be higher than the DHT series; KW-2000, KW-2100, and KW-2200), and the STABIACE HT series manufactured by Sakai Chemical Industry Co., Ltd.

When the hydrotalcite is a synthetic hydrotalcite, the manufacturing method thereof may be a conventionally known method, for example.

Hydrotalcite that has undergone surface treatment or hydrotalcite that has not undergone surface treatment (so that the surface of the hydrotalcite is untreated) may be used. Examples of surface treating agents to be used when performing surface treatment on hydrotalcite include fatty acids (including higher fatty acids) and fatty acid esters.

From the perspective of achieving high halogen catching capacity and superior adhesion between the gas barrier layer and the rubber layer, it is preferable for the hydrotalcite to be one that has not undergone surface treatment. Examples of commercially available hydrotalcites that have not undergone surface treatment include KW-2200 (manufactured by Kyowa Chemical Industry Co., Ltd.) and DHT-4C (manufactured by Kyowa Chemical Industry Co., Ltd.).

In addition, from the perspective achieving excellent mechanical properties of the rubber layer such as tensile strength ($T_B$) [MPa], elongation breakage ($E_B$) [%], and 100% modulus ($M_{100}$), a hydrotalcite that has undergone surface treatment is preferable, and a hydrotalcite that has undergone surface treatment with a higher fatty acid is more preferable. Examples of commercially available hydrotalcites that have been subjected to surface treatment include DHT-4A (subjected to surface treatment with a higher fatty acid; manufactured by Kyowa Chemical Industry Co., Ltd.) and DHT-4A-2 ($Mg_{4.3}Al_2(OH)_{12.6}CO_3$ is subjected to surface-treatment with a higher fatty acid; manufactured by Kyowa Chemical Industry Co., Ltd.).

A single hydrotalcite can be used or a combination of two or more hydrotalcites can be used.

In the present technology, the amount of hydrotalcite contained in the rubber composition is preferably from 1 to 8 parts by mass per 100 parts by mass of the raw rubber from the perspective of achieving superior adhesion between the gas barrier layer and the rubber layer. Within such a range, the vulcanization time and the physical properties of the rubber layer fall into appropriate ranges.

From the perspectives of achieving superior adhesion between the gas barrier layer and the rubber layer and for adjusting a vulcanization time to be an appropriate length, the amount of the hydrotalcite is preferably from 2 to 6 parts by mass and more preferably from 2 to 4 parts by mass per 100 parts by mass of the raw rubber.

From the perspectives of achieving superior adhesion between the gas barrier layer and the rubber layer and superior reinforcement of the rubber layer, the rubber composition preferably further contains carbon black.

From the perspectives of achieving superior adhesion between the gas barrier layer and the rubber layer and superior reinforcement of the rubber layer, colloidal characteristics of the carbon black used in the present technology are preferably such that $N_2SA$ is greater than or equal to 75 m$^2$/g, and the DBP absorption number is greater than or equal to 90 cm$^3$/100 g. If $N_2SA$ is less than 75 m$^2$/g or the DBP absorption number is less than 90 cm$^3$/100 g, it will be difficult to firmly bond the rubber layer to the surface of the gas barrier layer.

$N_2SA$ (nitrogen adsorption specific surface area) is preferably from 80 to 150 m$^2$/g and more preferably from 80 to 120 m$^2$/g.

The DBP absorption number is preferably from 95 to 140 cm$^3$/100 g and more preferably from 100 to 130 cm$^3$/100 g.

Here, "$N_2SA$" refers to the molecular weight of nitrogen adsorbed on the surface of the carbon black and specifically refers to a value found by taking measurements with the method stipulated by JIS K 6217-2.

"DBP absorption number" refers to the amount of oil adsorbed in the aggregate of the carbon black and specifically refers to a value found by taking measurements with the method stipulated by JIS K 6217-4.

Examples of the carbon black having $N_2SA$ greater than or equal to 75 m$^2$/g and DBP absorption number greater than or equal to 90 cm$^3$/100 g include carbon blacks of a grade that is not lower than ISAF (intermediate super abrasion furnace) or HAF (high abrasion furnace).

From the perspective of achieving superior adhesion between the gas barrier layer and the rubber layer, the compounded amount of the carbon black is preferably from 30 to 80 parts by mass and more preferably from 40 to 65 parts by mass per 100 parts by mass of the raw rubber. If the compounded amount is less than 30 parts by mass, it will be difficult to achieve the necessary adhesive strength. That is, it will be difficult to firmly bond the rubber layer to the surface of the gas barrier layer. If the compounded amount exceeds 80 parts by mass, the viscosity of the unvulcanized rubber will increase, which will inhibit the processability.

The rubber composition (rubber layer) may include crosslinking agents other than the alkylphenol-formaldehyde resin, zinc oxide (ZnO), vulcanization aids, vulcanization accelerators, and additives in addition to the raw rubber, the alkylphenol-formaldehyde resin, the hydrotalcites, and the carbon black.

Examples of the vulcanization aids include fatty acids such as acetyl acid, propionic acid, butanoic acid, stearic acid, acrylic acid, and maleic acid; and fatty acid zinc salts such as zinc acetylate, zinc propionate, zinc butanoate, zinc stearate, zinc acrylate, and zinc maleate.

Examples of vulcanization accelerators include thiuram-based vulcanization accelerators such as tetramethylthiuram disulfide (TMTD) and tetraethylthiuram disulfide (TETD); aldehyde/ammonia-based vulcanization accelerators such as hexamethylene tetramine; guanidine-based vulcanization accelerators such as diphenylguanidine; thiazole-based vulcanization accelerators such as dibenzothiazyl disulfide (DM); and sulfenamide-based vulcanization accelerators such as cyclohexyl benzothiazyl sulfenamide and the like.

Examples of additives include fillers such as clay, reinforcing agents other than carbon black, softeners such as paraffin oils, plasticizers, process aids, antiaging agents, pigments, tackifiers, lubricants, and dispersing agents.

The manufacturing method of the rubber composition is not particularly limited. For example, the rubber composition can be obtained by adding carbon black and the additives described above to the BIMS, the butyl rubber and/or the halogenated butyl rubber, and EPDM as necessary, mixing with a roll mixer, a Banbury mixer, or the like, and then adding and mixing the alkylphenol-formaldehyde resin, hydrotalcite, and, as necessary, other zinc oxides, vulcanization aids, and vulcanization accelerators.

The tensile strength ($T_B$) of the vulcanized sheet obtained from the resulting rubber composition is preferably at least 6 MPa and more preferably from 8 to 25 MPa from the perspective of achieving a superior balance of strength with adjacent members. The method of measuring the tensile strength ($T_B$) is the same as that shown in the Examples. The "balance of strength with adjacent members" refers a balance between the strength of the rubber layer and the strength of the gas barrier layer adjacent to the rubber layer or the strength of the reinforcing layer and outer tube layer which may be adjacent to the rubber layer. For example, in a hose such as that shown in the attached FIG. 2 having a structure comprising a gas barrier layer (resin), a rubber layer (including hydrotalcite), a reinforcing layer (for example, fibers or wires), and an outer tube layer, the gas barrier layer and the reinforcing layer are adjacent to the rubber layer. In such a case, if the strength of the rubber layer is low (less than 6 MPa), the rubber layer will become sandwiched by the harder gas barrier layer and reinforcing layer and will be likely to be damaged when the hose undergoes fatigue such as repeated vibration. When the tensile strength ($T_B$) of the vulcanized sheet obtained from the rubber composition is within the range described above, the rubber layer is unlikely to be damaged when the hose undergoes fatigue such as repeated vibration due to the excellent balance of strength with adjacent members.

The rubber layer can be formed by extrusion-molding the rubber composition into a tube shape, for example.

The thickness of the rubber layer is not particularly limited but is preferably from 0.5 to 3.0 mm.

The hose of the present technology may further have a reinforcing layer.

The reinforcing layer that may be provided in the hose of the present technology is not particularly limited and may be formed with a blade shape or with a spiral shape. Examples of materials that can be used for the reinforcing layer include thread and wire. Examples of reinforcing threads include threads formed from vinylon fibers, rayon fibers, polyester fibers, nylon fibers, aromatic polyamide fibers, and the like. In addition, examples of reinforcing wires include hard steel wires, and specific examples include brass-plated wires or zinc-plated wires for imparting anti-rust characteristics and adhesion.

The hose of the present technology may further have an outer tube layer.

In the present technology, the outer tube layer is formed on the outside of the inner tube layer or the reinforcing layer. The material, structure, thickness, and the like of the outer tube layer are not particularly limited, and conventionally used rubber compositions, resins, metal wires, and the like can be used. The same rubber composition used for the rubber layer of the inner tube layer can be used as the rubber composition. The rubber composition may also include crosslinking agents other than the alkylphenol-formaldehyde resin, fillers, reinforcing agents, plasticizers, antiaging agents, vulcanization accelerators, softeners, tackifiers, lubricants, dispersing agents, process aids, and the like as desired. Examples of resins include polyamide resins, polyester resins, polyurethane resins, polyacetal resins, vinyl chloride resins, polypropylene, and polyethylene. In addition, in order to enhance vibration absorption performance or to enhance strength by increasing the weight, the outer tube layer may contain metal and/or fibers to an extent that the flexibility of the hose can still be ensured and the vibration transmission resistance is not hindered. The outer tube layer can be formed so as to be solid or sponge-like, for example. Moreover, the outer tube layer may be configured as a type which is tube-like and is used by inserting the hose of the present technology therein or as a type which is helical or spring-like and is used by being wrapped around the hose of the present technology.

The thickness of the outer tube layer is preferably from 1 to 5 mm, more preferably from 0.5 to 3 mm, and even more preferably from 1 to 2 mm.

The outer tube layer may be formed from a plurality of layers.

The inner diameter, outer diameter, and length of the hose of the present technology are not particularly limited. For example, the inner diameter of the hose is preferably from 5 to 20 mm and more preferably from 7 to 17 mm.

A manufacturing method of the hose of the present technology will be described below.

The manufacturing method of the hose of the present technology is not particularly limited, and a conventionally known method can be used. For example, the gas barrier layer and the rubber layer can be respectively obtained by extrusion molding or coextrusion molding. Here, it is sufficient that the rubber layer be formed using the rubber composition described above. Moreover, it is sufficient that the gas barrier layer be formed using the polyamide resin composition described above.

In the hose of the present technology, the gas barrier layer and the rubber layer can be bonded directly by vulcanizing and/or crosslinking a laminate obtained by laminating a thermoplastic resin composition and a rubber composition. Specifically, a hose for transporting refrigerant having a gas barrier layer and a rubber layer can be manufactured by laminating a thermoplastic resin composition and a rubber composition and bonding the thermoplastic resin composition and the rubber composition by vulcanization and/or crosslinking. Vulcanization and/or crosslinking can be performed, for example, by heating at a temperature of approximately 150 to 180° C.

For example, in the case of the hose of the preferred embodiment described above using FIG. 2, the hose can be obtained by laminating the rubber layer on the outer surface of the gas barrier layer, laminating a reinforcing layer and then an outer tube layer (outside rubber layer) on the rubber layer by braiding, helical winding, or the like, and then vulcanizing the entire laminated body. The vulcanization (crosslinking) can be performed at a temperature from about 150° C. to 180° C.

As an example of another manufacturing method, the hose can be manufactured by sequentially laminating the gas barrier layer, the rubber layer, the reinforcing layer, and the outer tube layer on a mandrel and then vulcanization-bonding the laminate on the mandrel for from 30 to 180 minutes at a temperature of from 140° C. to 190° C. by press vulcanization, steam vulcanization, oven vulcanization (dry heat vulcanization), or hot water vulcanization.

Because the hose of the present technology has superior adhesion between the gas barrier layer and the rubber layer, the retention of gases and liquids at the bonding interface between the gas barrier layer and the rubber layer, which leads to bulging of the gas barrier at that portion, will not occur. In addition, with the hose of the present technology, because it is not necessary to use an adhesive or the like to bond the gas barrier layer and the rubber layer, adverse effects on the environment due to solvents contained in the adhesive are eliminated, and costs can be reduced as a result of reducing the manufacturing processes of the hose.

The refrigerant-containing composition that can be used in the hose of the present technology is not particularly limited. Examples thereof include compositions containing a refrigerant such as a fluorine-based compound and a lubricant.

Examples of the refrigerant contained in the refrigerant-containing composition include fluorine-based compounds with double bonds such as 2,3,3,3-tetrafluoropropene (structural formula: $CF_3$—$CF$=$CH_2$, HFO-1234yf); and saturated hydrofluorocarbons such as HFC-134a (structural formula: $CF_3$—$CFH_2$).

The lubricating oil contained in the refrigerant-containing composition is not particularly limited. Examples thereof include conventionally known products.

The hose of the present technology can be used to transport a refrigerant and, for example, can be used as a hose for transporting fluids such as a hose for use in air conditioning systems (for example, car air conditioning systems). In addition, the hose of the present technology can be used, for example, as a hose for transporting hot water (temperature regulator use) in addition to being usable as a hose for use in air conditioning systems.

EXAMPLES

The hose of the present technology will be described in further detail hereinafter using examples. However, the present technology is not limited to these examples.

<Manufacture of the Rubber Composition>

A rubber composition was manufactured by kneading the components shown below (excluding the brominated alkylphenol-formaldehyde resin, zinc stearate, and hydrotalcite 1) in the amounts (parts by mass) shown in Table 1 or Table 2 using a roll mixer or a Banbury mixer, adding the brominated alkylphenol-formaldehyde resin, zinc stearate, and hydrotalcite 1 to the mixture in the amounts (parts by mass) shown in Table 1 or Table 2, and then kneading the mixture.

IIR: Butyl rubber, EXXON BUTYL 268, manufactured by Japan Butyl Co., Ltd.

Br-IIR: Brominated butyl rubber, EXXON BROMOBUTYL 2255, manufactured by Japan Butyl Co., Ltd.

BIMS: Exxpro 3745, manufactured by ExxonMobil Chemical Company

EPDM 1: Mitsui EPT4070, manufactured by Mitsui Chemicals, Inc.

NBR: Nancar 3345, manufactured by Nantex Industry Co., Ltd.

SBR: Nipol 1502, manufactured by the Zeon Corporation

EPDM 2: Esprene 505A, manufactured by Sumitomo Chemical Co., Ltd.

NR: STR20, manufactured by Pt. Sunan Rubber

C.B. (ISAF): Carbon black, Shoblack N220, manufactured by Showa Cabot K.K.; carbon black having $N_2SA$ that is greater than or equal to 75 $m^2/g$ and DBP absorption number that is greater than or equal to 90 $cm^3/100$ g.

C.B. (HAF): Carbon black, Shoblack N330, manufactured by Showa Cabot K.K.; carbon black having $N_2SA$ that is greater than or equal to 75 $m^2/g$ and DBP absorption number that is greater than or equal to 90 $cm^3/100$ g.

C.B. (GPF): Carbon black, Seast V, manufactured by Tokai Carbon Co., Ltd.; carbon black having $N_2SA$ that is less than 75 $m^2/g$ and DBP absorption number that is less than 90 $cm^3/100$ g.

C.B. (SRF): Carbon black, Asahi #50, manufactured by Asahi Carbon Co., Ltd.; carbon black having $N_2SA$ that is less than 75 $m^2/g$ and DBP absorption number that is less than 90 $cm^3/100$ g.

Clay: Suprex Clay, manufactured by Kentucky Tennessee Clay Company

St Acid: Stearic acid, Lunac YA, manufactured by Kao Corporation

Hydrotalcite 1: KW-2200, manufactured by Kyowa Chemical Industry Co., Ltd.; $Mg_{0.7}Al_{0.3}O_{1.15}$; no surface treatment; subjected to calcination treatment.

Hydrotalcite 2: DHT-4A, manufactured by Kyowa Chemical Industry Co., Ltd.; $Mg_{4.5}Al_2(OH)_{13}CO_3 \cdot 3.5H_2O$; subjected to surface treatment with a higher fatty acid; no calcination treatment.

Paraffin oil: Process Oil 123, manufactured by Showa Shell Sekiyu K.K.

Aroma oil: A-OMIX, manufactured by Sankyo Yuka Kogyo K.K.

Zinc stearate: Zinc stearate, manufactured by Seido Chemical Industry Co., Ltd.

Antiaging agent 1: NONFLEX OD-3, manufactured by Seiko Chemical Co., Ltd.

Antiaging agent 2: OZONONE 6C, manufactured by Seiko Chemical Co., Ltd.

Zinc oxide: Zinc Oxide #3, manufactured by Seido Chemical Industry Co., Ltd.

Magnesium oxide: Kyowa Mag 150, manufactured by Kyowa Chemical Industry Co., Ltd.

Brominated alkylphenol-formaldehyde resin: Tackirol 250-I, manufactured by Taoka Chemical Co., Ltd.

Condensate of m-cresol and formaldehyde: Sumikanol 610, manufactured by Taoka Chemical Co., Ltd.

Polyvalent methylol melamine resin: Sumikanol 507A, manufactured by Bara Chemical Co., Ltd.

Sulfur: Oil treatment sulfur, manufactured by Hosoi Chemical Industry Co., Ltd.

Vulcanization accelerator 1: Sanceler TS, manufactured by Sanshin Chemical Industry Co., Ltd.

Vulcanization accelerator 2: Sanceler DM-PO, manufactured by Sanshin Chemical Industry Co., Ltd.

Vulcanization accelerator 3: Sanceler CM, manufactured by Sanshin Chemical Industry Co., Ltd.

Vulcanization accelerator 4: Sanceler NS-G, manufactured by Sanshin Chemical Industry Co., Ltd.

<Thermoplastic Resin Composition>

Manufacture of a Modified Polyamide Resin (Modified Polyamide Resin 1)

Using 100 parts by mass of nylon 6 "UBE Nylon" 1022B (manufactured by Ube Industries, Ltd.) as a raw polyamide resin, 1 part by mass of glycidol [Epiol (registered trademark) OH, manufactured by the NOF Corporation] as a compound (D) which is able to bond with a terminal amino group of the polyamide resin, and 30 parts by mass of n-butylbenzenesulfonamide (BM-4, manufactured by Daihachi Chemical Industry Co., Ltd.) as a plasticizer, the components were loaded into a twin-screw kneader (TEX44, manufactured by The Japan Steel Works, Ltd.) and melt-blended at a kneader temperature of 230° C. to produce a modified polyamide resin (nylon master batch; containing an end sealant). The resulting modified polyamide resin was used as the modified polyamide resin 1. Note that the modified polyamide resin 1 contained a plasticizer.

(Modified Polyamide Resin 2)

Using 100 parts by mass of nylon 666 "UBE Nylon" 5033B (manufactured by Ube Industries, Ltd.) as a raw polyamide resin, 1 part by mass of p-sec-butylphenyl glycidyl ether [Epiol (registered trademark) SB, manufactured by the NOF Corporation] as a compound (D) which is able to bond with a terminal amino group of the polyamide resin, and 30 parts by mass of n-butylbenzenesulfonamide (BM-4, manufactured by Daihachi Chemical Industry Co., Ltd.) as a plasticizer, the components were loaded into a twin-screw kneader (TEX44, manufactured by The Japan Steel Works, Ltd.) and melt-blended at a kneader temperature of 230° C. to produce a modified polyamide resin (nylon master batch; containing an end sealant). The resulting modified polyamide resin was used as the modified polyamide resin 2. Note that the modified polyamide resin 2 contained a plasticizer.

Manufacture of the Thermoplastic Resin Composition (Thermoplastic Resin Composition 1)

In a twin-screw kneader, 52 parts by mass of the modified polyamide resin 1 obtained as described above, 60 parts by mass of an ethylene-vinyl alcohol copolymer [Soarnol (registered trademark) A4412B, manufactured by Nippon Synthetic Chemical Industry Co., Ltd.] as an ethylene-vinyl alcohol copolymer (E), and 120 parts by mass of a maleic anhydride modified ethylene-propylene copolymer [TAFMER (registered trademark) MP-0620, manufactured by Mitsui Chemicals, Inc.; this will also be referred to as "MA-EPM" hereafter] as a modified raw rubber were loaded and melt-blended at a kneader temperature of 220° C. Once the maleic anhydride modified ethylene-propylene copolymer was dispersed in the ethylene-vinyl alcohol copolymer (E), 1.2 parts by mass of 3,3'-diaminodiphenylsulfone [3,3'-DAS, manufactured by Mitsui Fine Chemical, Inc.] was loaded and melt-blended as a hydrogen bond-forming compound (C) having a functional group which reacts with an acid anhydride group or an epoxy group and a functional group which is able to form a hydrogen bond with an amide bond or a hydroxyl group. The mixture was then continuously discharged from the extruder into a strand shape, cooled with water, and cut out with a cutter to obtain a pellet-shaped thermoplastic resin composition. The resulting thermoplastic resin composition was used as the thermoplastic resin composition 1.

(Thermoplastic Resin Composition 2)

In a twin-screw kneader, 131 parts by mass of the modified polyamide resin 2 obtained as described above, and 140 parts by mass of a maleic anhydride modified ethylene-propylene copolymer [TAFMER (registered trademark) MP-0620, manufactured by Mitsui Chemicals, Inc.] as a modified raw rubber were loaded and melt-blended at a kneader temperature of 220° C. Next, 1.4 parts by mass of 3,3'-diaminodiphenylsulfone [3,3'-DAS, manufactured by Mitsui Fine Chemical, Inc.] was loaded and melt-blended as a hydrogen bond-forming compound (C) having a functional group which reacts with an acid anhydride group or an epoxy group and a functional group which is able to form a hydrogen bond with an amide bond or a hydroxyl group. The mixture was then continuously discharged from the extruder into a strand shape, cooled with water, and cut out with a cutter to obtain a pellet-shaped thermoplastic resin composition. The resulting thermoplastic resin composition was used as the thermoplastic resin composition 2.

Young's Modulus of the Thermoplastic Resin Composition

A sheet was fabricated from each of the respective thermoplastic resin compositions 1 and 2 obtained as described above using an electric heating press at a temperature of 230° C. A test piece with dimensions of 5 mm (width)×80 mm (length)×0.15 mm (thickness) was cut out from the sheet and used as a test sample.

The Young's modulus of the obtained sample was measured in accordance with JIS K 7161 at a pulling speed of 50 mm/minute. The Young's modulus of the test sample obtained from the thermoplastic resin composition 1 was 270 MPa. The Young's modulus of the test sample obtained from the thermoplastic resin composition 2 was 250 MPa.

<Evaluation>

Tests were performed and evaluations conducted for the physical properties of the rubber composition, the adhesive strength of the rubber composition/thermoplastic resin composition, and delamination in accordance with the methods described below. The results thereof are shown in Tables 1 and 2.

Rubber Composition Physical Properties

Using a 150° C. press molding machine, each of the rubber compositions obtained as described above was vulcanized for 45 minutes under a surface pressure of 3.0 MPa to produce a vulcanized sheet having a thickness of 2 mm. JIS No. 3 dumbbell-shaped test pieces were cut out of these sheets and tensile tests were conducted in accordance with JIS K6251 at a pulling speed of 500 mm/minute. The tensile strength ($T_B$) [MPa], elongation breakage ($E_B$) [%], and 100% modulus ($M_{100}$) [MPa] were measured at room temperature.

A tensile strength ($T_B$) of at least 6 MPa is appropriate for the hose for transporting refrigerant in the present technology.

In addition, the hardness ($H_S$) at room temperature of each of cured products of each of the rubber compositions was measured using a type A durometer in accordance with JIS K6253.

Manufacture of the Hose

Hoses were manufactured using the rubber compositions and the thermoplastic resin compositions of each of the working examples and comparative examples.

Specifically, the thermoplastic resin composition 1 or 2 obtained as described above or nylon 6 ("UBE nylon" 1030 B, manufactured by Ube Industries, Ltd.; used in Comparative Examples 1-1, 1-2, 2, and 3) was first placed on a mandrel (outer diameter: 11 mm) and molded using an extruder to form a gas barrier layer having a thickness of 0.1 mm.

Next, using the rubber composition obtained as described above, a rubber layer having a thickness of 1.4 mm was formed on the outer surface of the gas barrier layer obtained above. After laminating the rubber layer on the outer surface of the gas barrier layer, the entire body was vulcanized to obtain a hose having only an inner tube layer. The vulcanization was performed at approximately 150° C. to 180° C. under vapor pressure. Thus, a hose having a wall thickness of 1.5 mm and an outer diameter of 14 mm was obtained.

In Comparative Example 1-1, the gas barrier layer and the rubber layer were bonded using an adhesive (Chemlok 402X, manufactured by Lord Corporation).

Rubber Composition/Thermoplastic Resin Composition Adhesive Strength Tests

The adhesive strength and rubber sticking were measured for each of the hoses obtained as described above when the rubber layer was peeled at a peeling speed of 50 mm/minute.

Here, "adhesive strength" refers to the adhesive strength (N) per 25 mm (width). Hoses that demonstrated an adhesive strength of 30 N/25 mm or greater were evaluated as "○", and hoses that demonstrated an adhesive strength of less than 30 N/25 mm were evaluated as "x".

The area and thickness of rubber sticking were evaluated.

The "rubber sticking (area)" refers to the area ratio (%) to which rubber that is peeled from the rubber layer sticks to the gas barrier layer after the rubber layer has been peeled following the adhesion strength evaluation.

The "rubber sticking (thickness)" refers to a visual evaluation of the thickness of the rubber stuck to the gas barrier layer after the rubber layer has been peeled off. The thickness was evaluated as "thick", "somewhat thick", "thin", and "interface" (meaning that the peeling occurred at the interface between the gas barrier layer and the rubber layer).

In the evaluation of the rubber sticking, cases where rubber sticking was "thick" were evaluated as "○ (excellent)", cases where rubber sticking was "somewhat thick" were evaluated as "Δ", and cases where rubber sticking was "thin" or that peeled at the "interface" were evaluated as "x".

Delamination

A hose having an inner diameter of 11 mm, an outer diameter of 14 mm (wall thickness of the hose was 1.5 mm), and a length of 50 cm was manufactured with the same method as that described above.

Next, a refrigerant (HFC-134a) was injected into the hose, and both ends of the hose were then capped and sealed. The sealed hose was then left to stand in an oven for 24 hours at 90° C. Here, the refrigerant was encapsulated so as to be 0.6 g/cm³.

Next, following the release of the refrigerant, the hose was immediately placed in a 120° C. oven and left to stand for 24 hours.

The hose was then cut in half (lengthwise), and the state of peeling of the resin (gas barrier layer) was confirmed. Hoses in which the resin did not peel were evaluated as "○", and hoses in which the resin did peel were evaluated as "x".

TABLE 1

| Exp. No. | Working Examples | | | | |
| --- | --- | --- | --- | --- | --- |
| | 1 | 2 | 3 | 4 | 14 |
| IIR | 100 | | | | |
| Br-IIR | | 100 | | 32 | 32 |
| BIMS | | | 100 | 13 | 13 |
| EPDM 1 | | | | 55 | 55 |
| NBR | | | | | |
| SBR | | | | | |
| EPDM 2 | | | | | |
| NR | | | | | |
| C.B (ISAF) | | 50 | 50 | 50 | 50 |
| C.B (HAF) | 80 | | | | |
| C.B (GPF) | | | | | |
| C.B (SRF) | | | | | |
| Clay | | | | | |
| St Acid | 3 | 2 | 2 | 2 | 2 |
| Paraffin oil | 10 | 5 | 5 | 5 | 5 |
| Aroma oil | | | | | |

TABLE 1-continued

| | | | | | | |
|---|---|---|---|---|---|---|
| Zn stearate | | 2 | 2 | 2 | 2 | 2 |
| Antiaging agent 1 | | | | | | |
| Antiaging agent 2 | | | | | | |
| Zinc oxide | | | | | | |
| Magnesium oxide | | | | | | |
| Brominated alkylphenol-formaldehyde resin | | 8 | 3 | 3 | 4 | 4 |
| Condensate of m-cresol and formaldehyde | | | | | | |
| Polyvalent methylol melamine resin | | | | | | |
| Sulfur | | | | | | |
| Vulcanization accelerator 1 | | | | | | |
| Vulcanization accelerator 2 | | | | | | |
| Vulcanization accelerator 3 | | | | | | |
| Vulcanization accelerator 4 | | | | | | |

Rubber composition physical properties BL (no aging)

| | | | | | | |
|---|---|---|---|---|---|---|
| TB | MPa | 9.2 | 13.2 | 11.4 | 18.2 | 18.2 |
| EB | % | 635 | 565 | 120 | 330 | 330 |
| M100 | MPa | 2.0 | 2.5 | 10.0 | 5.0 | 5.0 |
| Hs | | 70 | 73 | 83 | 79 | 79 |

Rubber composition physical properties (after aging for 72 hours at 120° C.)

| | | | | | | |
|---|---|---|---|---|---|---|
| TB | MPa | 10.4 | 14.5 | 12.0 | 18.8 | 18.8 |
| EB | % | 780 | 380 | 120 | 260 | 260 |
| M100 | MPa | 2.3 | 2.9 | 10.5 | 6.0 | 6.0 |
| Hs | | 75 | 80 | 86 | 82 | 82 |

Rubber composition/thermo-plastic resin composition adhesive strength tests

| | | | | | | |
|---|---|---|---|---|---|---|
| Film material | | Thermo-plastic resin comp.* 1 | Thermo-plastic resin comp. 1 | Thermo-plastic resin comp. 1 | Thermo-plastic resin comp. 1 | Thermo-plastic resin comp. 2 |
| Bonding specs.** | | Adhesive No | Adhesive No | Adhesive No | Adhesive No | Adhesive No |
| Adhesive strength | N/25 mm | 32 | 31 | 37 | 32 | 33 |
| | Eval.*** (≥30 N/25 mm) | ○ | ○ | ○ | ○ | ○ |
| Rubber sticking | Area ratio (%) | 100 | 100 | 100 | 100 | 100 |
| | Thickness | (Thick) | (Thick) | (Thick) | (Thick) | (Thick) |
| Rubber sticking evaluation | | ○ | ○ | ○ | ○ | ○ |
| Delamination | | ○ | ○ | ○ | ○ | ○ |

| | Comparative Examples | | | |
|---|---|---|---|---|
| Exp. No. | 1-1 | 1-2 | 2 | 3 |
| IIR | 100 | 100 | | |
| Br-IIR | | | 100 | |
| BIMS | | | | 100 |
| EPDM 1 | | | | |
| NBR | | | | |
| SBR | | | | |
| EPDM 2 | | | | |
| NR | | | | |
| C.B (ISAF) | | | 50 | 50 |

TABLE 1-continued

|  |  |  |  |  |  |
|---|---|---|---|---|---|
| C.B (HAF) |  | 80 | 80 |  |  |
| C.B (GPF) |  |  |  |  |  |
| C.B (SRF) |  |  |  |  |  |
| Clay |  |  |  |  |  |
| St Acid |  | 3 | 3 | 2 | 2 |
| Paraffin oil |  | 10 | 10 | 5 | 5 |
| Aroma oil |  |  |  |  |  |
| Zn stearate |  | 2 | 2 | 2 | 2 |
| Antiaging agent 1 |  |  |  |  |  |
| Antiaging agent 2 |  |  |  |  |  |
| Zinc oxide |  |  |  |  |  |
| Magnesium oxide |  |  |  |  |  |
| Brominated alkylphenol-formaldehyde resin |  | 8 | 8 | 3 | 3 |
| Condensate of m-cresol and formaldehyde |  |  |  |  |  |
| Polyvalent methylol melamine resin |  |  |  |  |  |
| Sulfur |  |  |  |  |  |
| Vulcanization accelerator 1 |  |  |  |  |  |
| Vulcanization accelerator 2 |  |  |  |  |  |
| Vulcanization accelerator 3 |  |  |  |  |  |
| Vulcanization accelerator 4 |  |  |  |  |  |
| Rubber composition physical properties BL (no aging) | | | | | |
| TB | MPa | 9.2 | 9.2 | 13.2 | 11.4 |
| EB | % | 635 | 635 | 565 | 120 |
| M100 | MPa | 2 | 2 | 2.5 | 10 |
| Hs |  | 70 | 70 | 73 | 83 |
| Rubber composition physical properties (after aging for 72 hours at 120° C.) | | | | | |
| TB | MPa | 10.4 | 10.4 | 14.5 | 12 |
| EB | % | 850 | 850 | 380 | 120 |
| M100 | MPa | 2.3 | 2.3 | 2.9 | 10.5 |
| Hs |  | 75 | 75 | 80 | 86 |
| Rubber composition/thermoplastic resin composition adhesive strength tests | | | | | |
| Film material |  | Nylon 6 | Nylon 6 | Nylon 6 | Nylon 6 |
| Bonding specifications |  | Chemlok 402X | Adhesive No | Adhesive No | Adhesive No |
| Adhesive strength | N/25 mm | 68 | 5 | 8 | 10 |
|  | evaluation (≥30 N/25 mm) | ○ | x | x | x |
| Rubber sticking | Area ratio (%) | 80 | 0 | 5 | 5 |
|  | Thickness | (Thin) | (Interface) | (Thin) | (Thin) |
| Rubber sticking evaluation |  | x | x | Δ | Δ |
| Delamination |  | x | x | x | x |

|  | Comparative Examples | | | |
|---|---|---|---|---|
| Exp. No. | 4 | 5 | 6 | 7 |
| IIR |  |  |  |  |
| Br-IIR |  |  |  |  |
| BIMS |  |  |  |  |
| EPDM 1 |  |  | 15 |  |
| NBR | 80 |  | 25 |  |
| SBR | 20 |  | 60 | 50 |
| EPDM 2 |  | 100 |  |  |
| NR |  |  |  | 50 |
| C.B (ISAF) |  |  |  |  |
| C.B (HAF) |  |  | 62 |  |
| C.B (GPF) | 85 |  |  | 60 |
| C.B (SRF) |  | 90 |  |  |
| Clay |  |  | 15 |  |
| St Acid | 1 | 1 | 1 | 1 |
| Paraffin oil |  | 30 |  |  |
| Aroma oil |  |  | 20 | 7 |
| Zn stearate |  |  |  |  |
| Antiaging agent 1 | 2 |  |  |  |
| Antiaging agent 2 |  |  | 2.5 |  |
| Zinc oxide | 5 | 5 | 5 | 3 |
| Magnesium oxide |  | 5 |  |  |
| Brominated alkylphenol-formaldehyde resin |  |  |  |  |

TABLE 1-continued

| | | | | | |
|---|---|---|---|---|---|
| Condensate of m-cresol and formaldehyde | | | | | 3 |
| Polyvalent methylol melamine resin | | | | | 6 |
| Sulfur | | 2 | 0.8 | 2 | 6 |
| Vulcanization accelerator 1 | | 0.7 | | | |
| Vulcanization accelerator 2 | | | 2.5 | | 2.5 |
| Vulcanization accelerator 3 | | | 2.5 | | |
| Vulcanization accelerator 4 | | | | 2 | |
| Rubber composition physical properties BL (no aging) | | | | | |
| TB | MPa | 15.5 | 13.2 | 14 | 25.3 |
| EB | % | 230 | 485 | 300 | 250 |
| M100 | MPa | 9 | 3.5 | 3.3 | 4.2 |
| Hs | | 80 | 67 | 70 | 68 |
| Rubber composition physical properties (after aging for 72 hours at 120° C.) | | | | | |
| TB | MPa | 16.3 | 11.5 | 13.5 | 10.3 |
| EB | % | 130 | 340 | 210 | 90 |
| M100 | MPa | 9.6 | 3 | 2.8 | — |
| Hs | | 84 | 72 | 78 | 88 |
| Rubber composition/thermoplastic resin composition adhesive strength tests | | | | | |
| Film material | | Thermoplastic resin composition 1 | Thermoplastic resin composition 1 | Thermoplastic resin composition 1 | Thermoplastic resin composition 1 |
| Bonding specifications | | Adhesive No | Adhesive No | Adhesive No | Adhesive No |
| Adhesive strength | N/25 mm | 1 | 2 | 2 | 28 |
| | Eval. (≥30 N/25 mm) | x | x | x | ○ |
| Rubber sticking | Area ratio (%) | 0 | 0 | 0 | 100 |
| | Thickness | (Interface) | (Interface) | (Interface) | (Thick) |
| Rubber sticking evaluation | | x | x | x | ○ |
| Delamination | | x | x | x | x |

*"Comp." is an abbreviation for "composition";
**"Specs." is an abbreviation for "specifications"; and
***"Eval." is an abbreviation for "evaluation".

TABLE 2

| | | Working Examples | | | |
|---|---|---|---|---|---|
| | | 5 | 6 | 7 | 8 |
| Rubber Composition Formulation | | | | | |
| Br-IIR | | 32 | 32 | 32 | 32 |
| BIMS | | 13 | 13 | 13 | 13 |
| EPDM 1 | | 55 | 55 | 55 | 55 |
| C.B (ISAF) | | 50 | 50 | 50 | 50 |
| St Acid | | 2 | 2 | 2 | 2 |
| Hydrotalcite 1 (KW-2200) | | | 0.5 | 1 | 2 |
| Hydrotalcite 2 (DHT-4A) | | | | | |
| Paraffin oil | | 5 | 5 | 5 | 5 |
| Zinc stearate | | 2 | 2 | 2 | 2 |
| Brominated alkylphenol-formaldehyde resin | | 3 | 3 | 3 | 3 |
| Rubber Composition Physical Properties | | | | | |
| TB | MPa | 17.2 | 17.1 | 17 | 16.7 |
| EB | % | 380 | 390 | 390 | 391 |
| M100 | MPa | 4.5 | 4.5 | 4.4 | 4.4 |
| Hs | | 77 | 77 | 76 | 75 |

TABLE 2-continued

| | | | | | |
|---|---|---|---|---|---|
| Rubber composition/thermoplastic resin composition adhesive strength tests (the thermoplastic resin composition 1 was used in all of the tests) | | | | | |
| Adhesive strength | N/25 mm | 30 | 33 | 40 | 45 |
| | Adhesive strength evaluation (≥30 N/25 mm) | ○ | ○ | ○ | ○ |
| Rubber sticking | Area ratio (%) | 100 | 100 | 100 | 100 |
| | Thickness | Somewhat thick | Somewhat thick | Thick | Thick |
| Rubber sticking evaluation | | Δ | Δ | ○ | ○ |
| Delamination | | ○ | ○ | ○ | ○ |

| | Working Examples | | | |
|---|---|---|---|---|
| | 9 | 10 | 11 | 12 |
| Rubber Composition Formulation | | | | |
| Br-IIR | 9 | 10 | 11 | 12 |
| | 32 | 32 | 32 | 32 |
| BIMS | 13 | 13 | 13 | 13 |
| EPDM 1 | 55 | 55 | 55 | 55 |

TABLE 2-continued

| | | | | | |
|---|---|---|---|---|---|
| C.B (ISAF) | | 50 | 50 | 50 | 50 |
| St Acid | | 2 | 2 | 2 | 2 |
| Hydrotalcite 1 (KW-2200) | | 4 | 8 | 10 | |
| Hydrotalcite 2 (DHT-4A) | | | | | 3 |
| Paraffin oil | | 5 | 5 | 5 | 5 |
| Zinc stearate | | 2 | 2 | 2 | 2 |
| Brominated alkylphenol-formaldehyde resin | | 3 | 3 | 3 | 3 |
| Rubber Composition Physical Properties | | | | | |
| TB | MPa | 15.3 | 10 | 5.4 | 17.7 |
| EB | % | 395 | 440 | 470 | 410 |
| M100 | MPa | 4.1 | 3.3 | 2.8 | 4.5 |
| Hs | | 75 | 73 | 72 | 77 |
| Rubber composition/ thermoplastic resin composition adhesive strength tests (the thermoplastic resin composition 1 was used in all of the tests) | | | | | |
| Adhesive strength | N/25 mm | 53 | 85 | 88 | 37 |
| | Adhesive strength evaluation (≥30 N/25 mm) | ○ | ○ | ○ | ○ |
| Rubber sticking | Area ratio (%) | 100 | 100 | 100 | 100 |
| | Thickness | Thick | Thick | Thick | Thick |
| Rubber sticking evaluation | | ○ | ○ | ○ | ○ |
| Delamination | | ○ | ○ | ○ | ○ |

As is clear from the results shown in Tables 1 and 2, in Comparative Example 1-1, where a gas barrier layer obtained using a material other than the thermoplastic resin composition used in the hose of the present technology and a rubber layer were bonded using an adhesive, rubber sticking was thin, and the resin peeled in the delamination test, indicating that the adhesion between the gas barrier layer and the rubber layer was insufficient. In Comparative Example 1-2 having a gas barrier layer obtained using a material other than the thermoplastic resin composition, the adhesive strength was low, and the rubber sticking was poor. The resin peeled in the delamination test, indicating that the adhesion between the gas barrier layer and the rubber layer was insufficient. In Comparative Examples 2 and 3 having gas barrier layers obtained using materials other than the thermoplastic resin composition, the adhesive strength was low, and the rubber sticking was thin. The resin peeled in the delamination test, indicating that the adhesion between the gas barrier layer and the rubber layer was insufficient. Comparative Example 2 corresponds to the embodiment described in Japanese Unexamined Patent Application Publication No. H10-114840A. In Comparative Examples 4 to 6 having rubber layers obtained using materials other than the rubber composition used in the hose of the present technology, the adhesive strength was low, and the rubber sticking was poor. The resin peeled in the delamination test, indicating that the adhesion between the gas barrier layer and the rubber layer was insufficient. In Comparative Example 7 having a rubber layer obtained using a rubber composition containing styrene butadiene rubber (SBR) and a natural rubber (NR), the elongation breakage (EB) of the rubber layer was not greater than 100 MPa, and the heat resistance of the rubber was low.

In contrast, in Working Examples 1 to 11, 14, and 15, it was possible to vulcanization-bond the resin layer and the rubber layer without pretreatment prior to adhesion on the resin layer and/or the rubber layer, and the adhesion between the gas barrier layer and the rubber layer was excellent.

Particularly, in Working Examples 4 to 11, 14, and 15, where the raw rubber included the BIMS, Br-IIR as the halogenated butyl rubber, and the EPDM, adhesive strength was high and adhesion was superior.

In Working Examples 6 to 11, and 15 in which the rubber composition further contained the hydrotalcite, the adhesive strength was high and the adhesion was excellent. In particular, the adhesive strength was higher and the adhesion was superior when the amount of the hydrotalcite was at least 1 part by mass per 100 parts by mass of the raw rubber (Working Examples 7 to 11 and 15).

Additionally, the resin did not peel in the delamination tests for Working Examples 1 to 11, 14, and 15.

Working Example 12

Manufacture of a Hose Having a Reinforcing Layer and an Outer Tube Layer

A hose was manufactured as follows. A gas barrier layer was extruded to a thickness of 0.15 mm with the thermoplastic resin composition 1 of Working Example 4 using a resin extruder on the surface of a mandrel made of a thermoplastic resin having an outer diameter of 11 mm (extrusion temperature: 240° C.), and a rubber layer having a thickness of 1.2 mm (rubber composition of Working Example 4) was extruded onto the surface thereof to form an inner tube layer. A two-layer reinforcing layer was formed on the inner tube layer by alternately winding polyethylene terephthalate (PET) fibers having a gross thread thickness of 80,000 dtex in a helical manner. A cover rubber layer having a thickness of 1.0 mm (the butyl rubber composition A described below was used) was extruded onto the reinforcing layer to form an extruded outer tube layer, and a conventional polymethylpentene resin was extruded onto the cover rubber layer to form a cover skin. After the resulting tube-shaped laminate was vulcanized for 100 minutes at 160° C., the cover skin and the mandrel were removed from the tube-shaped laminate. The resulting hose was used as hose 1. The hose 1 has superior adhesion between the gas barrier layer and the rubber layer.

Butyl rubber composition A (cover rubber layer): A composition comprising 100 parts by mass of butyl rubber, 80 parts by mass of carbon black (HAF), 3 parts by mass of stearic acid, 10 parts by mass of paraffin oil, 2 parts by mass of zinc oxide, and 8 parts by mass of a brominated alkylphenol-formaldehyde resin.

Working Example 13

Manufacture of a Hose Having a Reinforcing Layer and an Outer Tube Layer

A hose 2 was manufactured in the same manner as in Working Example 12 with the exception of forming the inner tube layer in accordance with Working Example 9. The hose 2 has superior adhesion between the gas barrier layer and the rubber layer.

What is claimed is:

1. A hose for transporting refrigerant comprising an inner tube layer having a gas barrier layer and a rubber layer adjacent to an outer surface of the gas barrier layer, wherein:
the gas barrier layer is formed using a thermoplastic resin composition comprising a polyamide resin (A) and a modified rubber (B) having an acid anhydride group or an epoxy group, the modified rubber (B) being obtained by modifying a modified raw rubber having an acid anhydride group or an epoxy group with a hydrogen bond-forming compound (C) having a functional group which reacts with the acid anhydride group or the epoxy group and a functional group which is able to form a hydrogen bond with an amide bond or a hydroxyl group;

the rubber layer is formed using a rubber composition comprising from 1 to 15 parts by mass of an alkylphenol-formaldehyde resin per 100 parts by mass of a raw rubber and from 30 to 80 parts by mass of a carbon black per 100 parts by mass of the raw rubber, the carbon black having $N_2SA$ that is greater than or equal to 75 m$^2$/g and DBP absorption number that is greater than or equal to 90 cm$^3$/100 g;

the raw rubber comprises a BIMS and a copolymer rubber (1) which is a butyl rubber and/or a halogenated butyl rubber, and EPDM;

in the raw rubber, a content of the BIMS is from 5 to 40 parts by mass, a total content of the BIMS and the copolymer rubber (1) is from 20 to 80 parts by mass, and a content of the EPDM is from 80 to 20 parts by mass; and there is no adhesive layer between the gas barrier layer and the rubber layer.

2. The hose for transporting refrigerant according to claim 1, wherein: the functional group which reacts with the acid anhydride group or the epoxy group is at least one selected from the group consisting of amino groups, hydroxyl groups, carboxyl groups, and mercapto groups; and the functional group which is able to form a hydrogen bond with an amide bond or a hydroxyl group is at least one selected from the group consisting of sulfone groups, carbonyl groups, ether bonds, hydroxyl groups, and nitrogen-containing heterocycles.

3. The hose for transporting refrigerant according to claim 1, wherein the rubber composition further comprises hydrotalcite, and an amount of the hydrotalcite is from 1 to 8 parts by mass per 100 parts by mass of the raw rubber.

4. The hose for transporting refrigerant according to claim 1, wherein an amount of the hydrogen bond-forming compound (C) is from 0.1 to 5 parts by mass per 100 parts by mass of the modified raw rubber.

5. The hose for transporting refrigerant according to claim 1, wherein the polyamide resin (A) contains a modified polyamide resin (A') obtained by melt-blending 100 parts by mass of a polyamide resin and from 0.05 to 5 parts by mass of a compound (D) which is able to bond with a terminal amino group of the polyamide resin, at a higher temperature than or equal to the melting point of the polyamide resin.

6. The hose for transporting refrigerant according to claim 1, wherein the thermoplastic resin composition further comprises an ethylene-vinyl alcohol copolymer (E).

7. The hose for transporting refrigerant according to claim 1, wherein an amount of the modified raw rubber is from 90 to 175 parts by mass per 100 parts by mass of the polyamide resin (A) or per 100 parts by mass of a total of the polyamide resin (A) and the ethylene-vinyl alcohol copolymer (E).

8. The hose for transporting refrigerant according to claim 6, wherein a mass ratio of the polyamide resin (A) to the ethylene-vinyl alcohol copolymer (E) [polyamide resin (A)/ethylene-vinyl alcohol copolymer (E)] is from 90/10 to 10/90.

9. The hose for transporting refrigerant according to claim 1, wherein a reinforcing layer is provided on the inner tube layer and an outer tube layer is provided on the reinforcing layer.

10. A manufacturing method of a hose for transporting refrigerant in which the hose for transporting refrigerant described in any claim 1 is manufactured by: laminating the thermoplastic resin composition and the rubber composition, and bonding the thermoplastic resin composition and the rubber composition by vulcanization and/or crosslinking.

11. The hose for transporting refrigerant according to claim 1, wherein the alkylphenol-formaldehyde resin has a halogen.

* * * * *